March 3, 1936. G. B. VROOM 2,032,383
METER
Filed March 15, 1926  2 Sheets-Sheet 1

Inventor
Guysbert B. Vroom

By Robert A. Lavender
Attorney

March 3, 1936.  G. B. VROOM  2,032,383
METER
Filed March 15, 1926   2 Sheets-Sheet 2

Section at A-B-C-D.

Inventor
Guysbert B. Vroom.

By Robert A. Lavender
Attorney

Patented Mar. 3, 1936

2,032,383

UNITED STATES PATENT OFFICE 2,032,383

METER

Guysbert B. Vroom, Washington, D. C.

Application March 15, 1926, Serial No. 94,915

20 Claims. (Cl. 177—351)

(Granted under the act of March 3, 1883, as amended April 30, 1928; 370 O. G. 757)

My invention relates to a meter and more particularly to a meter for measuring the rate of flow of fluids, such as liquid, gaseous or vaporized liquids, and the like.

An object of the invention is to provide a device of the character described employing a flexible element, the flexure of which varies in proportion to the kinetic pressure of the fluid and consequently the rate of flow.

Another object is to provide a flow measuring device that is simple and accurate in operation and the cost of manufacture of which is reduced to a minimum.

With the above and other objects in view the invention consists in the construction, combination and arrangement of parts as will be hereinafter more fully described.

Figure 1:
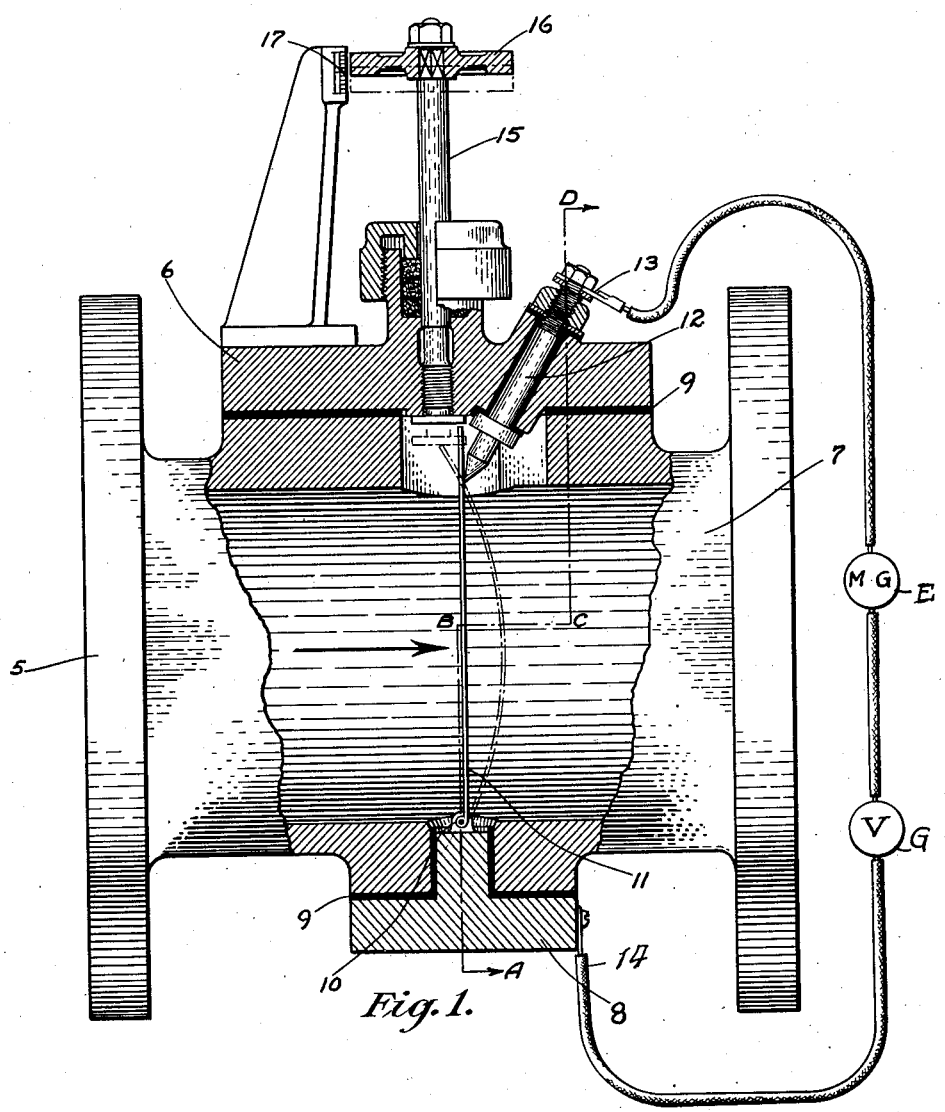
Figure 2:
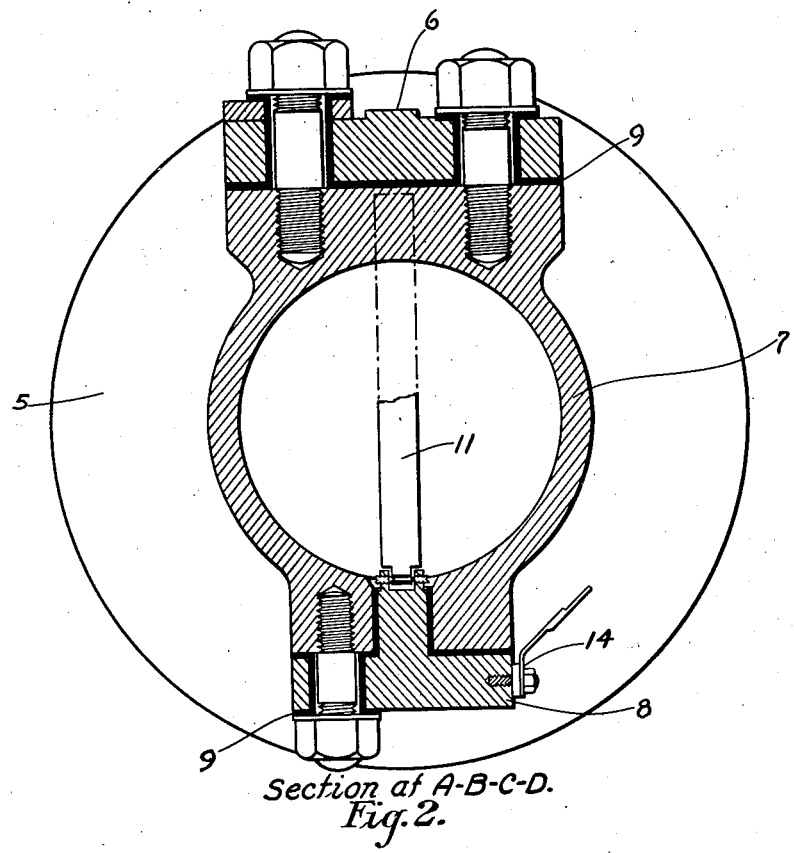

Reference is to be had to the accompanying drawings forming part of this specification, in which like reference characters indicate corresponding parts throughout the several views, and in which Figure 1 is a part sectional view, and Figure 2 is a view on the line A—B—C—D of Figure 1.

Referring more particularly to the drawings, 5 is a body member adapted to be connected to a fluid line with the direction of flow in the direction indicated by the arrow. The body member is composed of an upper cover or bonnet 6, central portion 7, and lower cover or bonnet 8, all being insulated one from the other by suitable insulating material, 9, and so secured to one another that they may be easily and quickly disassembled, permitting easy access to the interior.

The lower bonnet 8 carries a plurality of ears 10 forming a bearing about which a flexible electrical conductor element 11 may be pivoted. As pointed out later in this specification this element should be of a metal or electric conducting material, such as Monel metal. I prefer Monel metal as experiments have shown that it is flexible enough to be affected by the kinetic pressures normally encountered in practice and is hard enough to resist wear at the contact point. However, I provide a terminal plug 12 so placed that it passes into the body and the free end of the element butts against it causing a flexure of the element when acted upon by the force of the liquid passing through the body. The plug is provided with an electrical connection 13 of any desired type, and there is also a terminal fitting 14 secured to the lower bonnet 8. A galvanometer G, or other registering device of any well known type, is inserted in the electrical path between the terminals 13 and 14, in which circuit is also a source of electric energy E which may be either a primary or storage battery or a direct or alternating current generator, and I also employ a mechanical checking device such as a micrometer comprising a shaft 15, screw-threaded through bonnet 6 at an angle to plug 12, and having a head 15a upon its end adjacent the free end of element 11. The stuffing box 15b, mounted on the outer surface of bonnet 6, prevents leakage around shaft 15. Secured upon the outer end of shaft 15 is a graduated hand wheel 16 registering with its adjacent scale 17 fixedly mounted upon bonnet 6. In practice said head 15a is delicately adjusted to initial contact with the free end of element 11, when unflexed, and the zero reading obtained from wheel 16 and scale 17, so that when said contact is reestablished during the flexure of element 11 said wheel 16 and scale 17 will indicate the degree of flexure of element 11 either directly or in terms of any desired function of such flexure, the operator's sense of touch determining each such initial contact. Said sense of touch is also designed to be independently checked by observing the fluctuation of the electric indicator which occurs as hereinafter explained upon each such initial contact. The micrometer may be used to accurately determine the rate of flow should the electrical circuit fail to function properly, as well as to provide a check upon said electrical circuit indicating means, or to indicate a different function of the flexure, of element 11 than indicated by said electric indicating means, either or both as may be desired.

The meter body forms an integral part of the fluid line and the flexible element with its longitudinal axis at an angle to the axis of flow is fixed at one end, and being in sliding engagement near its free end with the inner end of plug 12 mounted in bonnet 6 at an angle to the element 11. When force is exerted against the element, tending to rotate it about its bearing, the plug stops it and causes it to bend, the amount of flexure depending on the amount of pressure exerted against the face of the element.

The upper and lower bonnets, which support respectively the upper terminal 13, and the lower terminal 14 and flexible element, being insulated one from the other, complete an electrical circuit through the flexible member. The distance between the bearing of the element and the plug 12 is normally constant, but flexure of the element increases its length between the bearing and plug, and therefore varies the electrical characteristics of the circuit; that is, the resistance is varied through the flexible element.

It is desirable to eliminate as many variable and correction factors as possible. My invention indicates several such eliminations, such as:— when using the micrometer, the exact point of initial contact with the element may be determined independent of, and with greater delicacy and precision than, the sensitiveness of touch of the operator, because each such initial contact of head 15a with element 11 will cause a fluctuation, as hereinafter stated, of the sensitive electric indicator needle, and thus indicate with precision the initial point of said contact.

Upon, and during the period of, the contact of head 15a with the end of element 11, a condenser of substantial capacity is thereby brought into said circuit only during the period of said contact. One plate of said condenser is formed of said shaft 15 and bonnet 6, while its other plate is formed of said member 7 and its uninsulated connections; the dielectric of said condenser consisting of the insulating material 9 between said bonnets 6 and member 7.

With direct current the change in the characteristics of the electric circuit, occurring at the time of, and caused by said entry of said condenser into the circuit, is of such an appreciable nature, due to the capacity of said condenser, as to cause a positive though transient indication upon the electric indicating means G, which indication is evidenced by a fluctuation apparent upon said indicating means G.

However when alternating current is employed, such entry into the circuit of said condenser will cause a substantial change in electrical indicating means G enduring as long as said head 15a contacts with element 11, which contact in all cases must be quite brief, as otherwise said contact would prevent free flexure of the element 11 and hence prevent it from responding to the functions of the medium surrounding it, and thereby cause a false indication warming up the instrument to the temperature which it will reach during test will take care of all changes due to expansion. The zero reading can be then obtained for the micrometer and the scale of the galvanometer, thus eliminating a temperature correction. The temperature of the contents of the passageway may be solely indicated by means of the indications 17 and associated parts when there is the absence of sufficient flow of said content to flex member 11. The flexible element surface extends across a diameter of the body, and therefore integrates variations in rate of flow in different parts of the body due to friction, etc., since the reading in deflection is a function of the total force exerted. Compensation for any wear of the contact point of plug 12, and of element 11 in the area of such contact, may be compensated by recalibrating the electric indicator, or by allowance being made therefore in the calculations therefrom, or by the requisite relative adjustment of plug 12 and bonnet 6 by the adjustment of the nut securing said plug 12 tightly fitting its hole in bonnet 6 or by a suitable shim or shims under the enlarged head of plug 12, or otherwise.

The opening into central portion 7 from bonnet 8 is large enough to permit the ready introduction and removal of element 11 therethrough upon the attachment or removal of bonnet 8 by its insulated screw shown in Figure 2.

The ready removal and replacement, by insulated screws shown in Figure 2, of bonnet 6, with its component plug 12 and shaft 15, projecting into the opening through the wall of central portion 7 covered by bonnet 6, readily enables the area of contact between plug 12 and element 11, and the contacting surfaces of head 15a and element 11, to be easily inspected for wear, and for polishing for better electrical conductivity; as well as provides during removal and replacement of bonnet 6, means for maintaining the relative distance between the contact point of plug 12 and head 15a and thus enabling the uniform functioning of the mechanical and electrical indicating means before and after such inspection; while the mounting of scale 17 upon bonnet 6, which also bears micrometer screw shaft 15, further preserves the calibration of wheel 16 and scale 17 during said removals of bonnet 6 which occurrence may be frequent.

Bonnet 8 need not be removed from portion 7 except when a replacement of element 11 is required.

The above described instrument was designed primarily to be used in connection with a steam line, but it may with equal reliability be used to determine the rate of flow of water, gas or any other liquid or vaporized liquid. While the electrical conductivity of certain liquids or fluids is greater than that of others, actual experience has shown that after proper calibration, the instrument will function with a high degree of efficiency for measuring the flow of practically all liquids.

It will be appreciated by those skilled in this art that the flow is one function of the fluid in pipe or body 7 and that the temperature is another function of such fluid and that said functions are in a substantial sense interdependent factors in connection with the measurement of or other determination as to said fluid; and that screw 15, cooperable with the end of sensitive means 11, may obviously indicate the temperature expansion or contraction of said means even when the fluid, with which it is surrounded and in contact, is at rest; and that the electric circuit, of which said sensitive means form a part, may also indicate or disclose the temperature of said fluid due to the electrical resistance variations of said means due to temperature differences.

It will be understood that the above description and accompanying drawings comprehend only the general and preferred embodiment of my invention and that various minor changes in details of construction, proportion and arrangement of parts may be made within the scope of the appended claims and without sacrificing any of the advantages of my invention.

The invention herein described may be manufactured and used by or for the Government of the United States for governmental purposes without the payment to me of any royalty thereon or therefor.

What I claim as new is:—

1. In a meter of the character described a body portion having a fluid passage therethrough of substantially the same area throughout its length and through which a fluid is adapted to flow, and said flow to be metered through the force of said flow, a flexible element connected to said body portion at a point substantially within said area and extending completely across and having a surface at a substantial angle to the direction of flow through said passage, said surface being of an area of a small part of the area of said passage, said element being capable of being flexed by the kinetic energy of a fluid flowing through said passage, means for connecting one end of the element to said body substantially at the edge of said passage; and measuring means, mounted in definite relation to the first stated means, and having a portion thereof movable from a definite point into engagement with a surface of said element for measuring the flexure of the element.

2. In a meter of the character described a body portion having a fluid passage therethrough of substantially the same area throughout its length and through which a fluid is adapted to flow, and said flow to be metered through the force of said flow, a flexible element connected to said body portion at a point substantially within said area and extending completely across and narrower than the passage capable of being differently flexed by and relative to different velocities of a fluid flowing through the passage, means for connecting one end of the element to said body, mechanical measuring means mounted in definite relation to the first stated means and manually movable proportionate to the flexure of the element into engagement with the element for measuring the flexure of the element, and electric circuit means for indicating the connection with the element of said mechanical means.

3. In a meter of the character described a body portion having a fluid passage therethrough of substantially the same area throughout its length and through which a fluid is adapted to flow, and said flow to be metered through the force of said flow, a flexible element connected to said body portion at a point substantially within said area and extending completely across and narrower than the passage capable of occupying different distances between its ends and of being differently flexed by different velocities of a fluid flowing through the passage, means for connecting one end of the element to said body, means for slidably connecting the other end of the element to said body, and coacting indicating and micrometer screw means mounted in definite relation to the first stated means, said screw means being mounted for movement proportionate to the flexure of the element into engagement with the slidably connected end of the element for measuring on the indicating means the flexure of the element.

4. In a meter of the character described including a passageway therethrough of substantially the same area throughout its length and through which a fluid is adapted to flow, and said flow to be metered through the force of said flow, a flexible element connected to said body portion at a point substantially within said area and extending across and narrower than the passageway, and which element is flexed by the kinetic energy of fluid flowing through the passageway, a support slidably engaged by a portion of said element, the extent of the slide being substantially proportionate to the flexure of the element, and means for measuring the flexure of said element.

5. In a meter of the character described including a fluid passageway therethrough of substantially the same area throughout its length and through which a fluid is adapted to flow, and said flow to be metered through the force of said flow, a flexible element connected to said body portion at a point substantially within said area and extending across and narrower than the passageway and having one end anchored and its other end unanchored, said element being anchored at one edge of said passageway and capable of flexure by pressure of a fluid flowing through said passageway, and measuring means mounted on and projecting from the body portion, said measuring means having a portion thereof fixed upon an outer surface of the body portion and another portion thereof extending within the body portion and movable from a definite point into contact with an unanchored portion of the flexible element, said portions of the measuring means indicating, at the point of said contact, the flexure of, and rate of flow past, the flexible element.

6. In a meter of the character described including a body portion provided with a fluid passageway therethrough of substantially the same area throughout its length and through which a fluid is adapted to flow, and said flow to be metered through the force of said flow, a flexible element connected to said body portion at a point substantially within said area and extending across and narrower than the passageway, means for supporting said element at opposite edges of said passageway with said element flexing between said supports proportionate to the flow through said passageway, and juxtaposed micrometer screw and scale means mounted on said body and relatively movable proportionate to the flexure of the element for measuring the flexure of the element and the rate of flow past the element.

7. In a meter of the character described including a body portion provided with a fluid passageway therethrough of substantially the same area throughout its length and through which a fluid is adapted to flow, and said flow to be metered through the force of said flow, a flexible element connected to said body portion at a point substantially within said area and extending across and narrower than the passageway and having one end unanchored, means for supporting said element at opposite edges of said passageway with the element flexing between said supports and longitudinally movable relative to one of the supports, a micrometer screw mounted on said body in axial alignment with the movable end of the element and operable from normal position into engagement with said movable end, means for indicating the range of movement of the screw from normal position to said engagement, and electrical means for indicating the engagement of said screw with said element.

8. In a meter of the character described including a fluid passageway therethrough, a flexible element having a known resistance to the flow of electric current extending across and narrower than the passageway and adapted to be flexed by the pressure of a fluid flowing through said passageway, means for anchoring one end of the said element, and a combined electrical contact and support on one end of the element permitting flexing of said element and lengthening of the portion of the element disposed in an electric circuit whereby the resistance of said circuit is varied corresponding to the flexure of the element.

9. In a meter, a member having a passage therethrough of substantially the same area throughout its length and through which fluid is adapted to flow and to be metered through the force of said flow, means variably movable proportionate to the stress therein produced by the conditions of the substance in said passage, a mechanical indicating means normally maintainable out of contact with said movable means and adapted to indicate the extent of movement of said movable means when brought into contact therewith, an electrical indicating means, and an electric closed circuit through said movable means and said electrical indicating means.

10. In a meter, a member having a passage therethrough of substantially the same area throughout its length and through which fluid is adapted to flow and to be metered through the force of said flow, means variably movable proportionate to the stress therein produced by the conditions of the substance in said passage, a mechanical indicating means including a scale and micrometer screw normally maintainable out of contact with said movable means and adapted to indicate the extent of movement of said movable means when said screw contacts therewith, an electrical indicating means, and means for passing an electric current through said electrical indicating means and variably through said movable means in relation to its extent of movement due to said conditions of the substance in said passage.

11. In a meter, a member having a passage therethrough of substantially the same area throughout its length and through which fluid is adapted to flow and to be metered through the force of said flow, means variably movable proportionate to the stress therein produced by the conditions of the substance in said passage, a mechanical indicating means connectible with said movable means, an electrical circuit means controlled by said movable means and including an electrical indicating means, means whereby said mechanical indicating means is normally maintained out of connection with said movable means, means whereby said mechanical means indicates the extent of movement of said movable means upon connection therewith, and means whereby said electrical means indicates said connection.

12. In a meter, a member having a passage therethrough of substantially the same area throughout its length and through which fluid is adapted to flow and to be metered through the force of said flow, means variably movable proportionate to the stress therein produced by the conditions of the substance in said passage, an indicating means, means whereby said indicating means may be manually operated, means whereby said indicating means indicates the extent of movement of said variably movable means through contact therewith, and means for indicating the initial period of each such contact.

13. In a meter, a member having a passage therethrough of substantially the same area throughout its length and through which fluid is adapted to flow and to be metered through the force of said flow, means variably movable proportionate to the stress therein produced by the conditions of the substance in said passage, indicating means mounted at a distance from said variably movable means, and means connected to said indicating means and extending within the member and normally maintained out of contact with and mounted to move toward and away from said variably movable means, for operating said indicating means.

14. In a meter, a member having a passage therethrough of substantially the same area throughout its length and through which fluid is adapted to flow and to be metered through the force of said flow, means variably movable proportionate to the stress therein produced by the conditions of the substance in said passage, means mounted on said member and normally maintainable out of contact, and abnormally movable into contact, with said variably movable means in any of its various positions, means for indicating the extent of movement of said second named means, manual means whereby said second named means may be moved and the sense of touch of the operator detect contact between said variably movable and said second named means, and supplemental means for indicating each of said contacts.

15. In a meter, a member having a passage therethrough of substantially the same area throughout its length and through which fluid is adapted to flow and to be metered through the force of said flow, sensitive means extending within said passage and movable toward one end proportionate to the stress therein produced by the conditions of the substance in said passage, means mounted on said member normally out of engagement with and movable from normal position proportionate to the movement of and into contact with the unmentioned end of said proportionately movable means, means for indicating the extent of movement of said second named means, manual means whereby said second named means may be moved and the sense of touch of the operator detect contact between said sensitive and said second means, and electrical means, including a closed circuit through said sensitive means, whereby the movement of said sensitive means may be indicated as well as each such contact disclosed.

16. In a meter, a member having a passage therethrough adapted to accommodate the flow therethrough of the medium to be metered, means within and of lesser area than the cross section of said passage and sensitive to the stress produced therein by the conditions of the substance in said passage in direct contact therewith, means for mounting said sensitive means and whereby the same is electrically resistant proportionate to said stress, electric indicating means, and means for passing an electric current through said indicating and sensitive means.

17. In a meter, a member having a passage therethrough, variable resistance means within and of lesser area than the cross section of said passage and sensitive to the stress produced therein by the conditions of the substance in said passage and in contact with said sensitive means; separated electric contact means in engagement with separate portions of said sensitive means, electric indicating means; and means for passing an electric current through said indicating, contact and sensitive means and varying said current proportionate to said stress on said sensitive means.

18. In a meter, a member having a passage therethrough of substantially the same area throughout its length and through which fluid is adapted to flow and to be metered through the force of said flow, sensitive means extending within said passage and movable proportionate to the stress produced therein by the conditions of the substance in said passage, separated electric contact means in engagement with said sensitive means; electric indicating means, means for passing an electric current through said indicating, contact and sensitive means, and means for varying the electric resistance of said sensitive means between said separated contact means proportionate to said stress, and mechanical means for indicating a characteristic of said stress.

19. In a meter, a member having a main passage therethrough of substantially the same area throughout its length and through which fluid is adapted to flow and to be metered through the force of said flow, and a branch passage through one wall thereof, a member extending within said main and branch passages and being movable proportionate to the stress produced therein by the varying conditions of the substance in said passages, a stationary member in engagement with said variably movable member, a bonnet covering said branch passage and supporting said stationary member, means for removably securing said bonnet to said member, a plurality of indicating means one of which being mounted upon said bonnet, and means including the varying relation of said variably movable member to said stationary member whereby each of the indicating means indicates the conditions producing said stress.

20. In a meter, a member having a passage therethrough of substantially the same area throughout its length and through which fluid is adapted to flow and to be metered through the force of said flow, means movable proportionate to the stress produced therein by the conditions of the substance in said passage; electric indicating means, independent indicating means, an electrical condenser means electrically connected to an element of said independent indicating means, electric circuit means embracing said electric indicating means and said movable means, means including said movable means for varying, proportionate to the movement of said movable means a characteristic of said circuit means, and means for bringing said condenser means into said circuit means at a reading point of said independent indicating means, whereby said electric indicating means may also indicate the attainment of said reading point.

GUYSBERT B. VROOM.